(12) United States Patent
Kanamarlapudi et al.

(10) Patent No.: US 12,720,305 B2
(45) Date of Patent: Aug. 25, 2026

(54) ACCESS STRATUM SECURITY FOR MEDIUM ACCESS CONTROL TRANSPORT BLOCKS

(71) Applicant: QUALCOMM Incorporated, San Diego, CA (US)

(72) Inventors: Sitaramanjaneyulu Kanamarlapudi, San Diego, CA (US); Soo Bum Lee, San Diego, CA (US); Gavin Bernard Horn, La Jolla, CA (US)

( * ) Notice: Subject to any disclaimer, the term of this patent is extended or adjusted under 35 U.S.C. 154(b) by 399 days.

(21) Appl. No.: 18/454,976

(22) Filed: Aug. 24, 2023

(65) Prior Publication Data

US 2025/0071545 A1 Feb. 27, 2025

(51) Int. Cl.
*H04W 12/037* (2021.01)

(52) U.S. Cl.
CPC .................................. *H04W 12/037* (2021.01)

(58) Field of Classification Search
CPC ... H04W 12/037; H04W 80/02; H04W 12/03; H04L 9/0866; H04L 2209/80; H04L 63/0428; H04L 63/162
See application file for complete search history.

(56) References Cited

U.S. PATENT DOCUMENTS 8,379,855 B2 * 2/2013 Kubota ................. H04L 1/1607 380/255
8,953,781 B2 * 2/2015 Kim ...................... H04W 12/02 380/27
10,135,610 B2 * 11/2018 Sammour ........... H04W 12/033
2007/0067164 A1 * 3/2007 Goudar ................. G10L 19/107 704/E19.033
2007/0081673 A1 * 4/2007 Ren ....................... H04L 9/3242 380/270
2007/0097934 A1 * 5/2007 Walker ................ H04L 63/0428 370/395.53
2008/0226074 A1 * 9/2008 Sammour ........... H04W 12/033 380/270
2009/0019539 A1 * 1/2009 Jonnalagadda ..... H04W 12/126 726/14
2010/0067698 A1 * 3/2010 Hahn .................... H04L 63/123 380/270
2015/0026453 A1 * 1/2015 Liu ......................... H04L 63/08 713/151

FOREIGN PATENT DOCUMENTS

JP 3808660 B2 * 8/2006 ............ H04W 12/06
JP 4671776 B2 * 4/2011 ............ H04W 12/02
WO WO-9903215 A1 * 1/1999 ......... H04B 7/18567
WO 2023044785 A1 3/2023
WO WO-2025042501 A1 * 2/2025 ........... H04L 63/162

OTHER PUBLICATIONS

International Search Report and Written Opinion—PCT/US2024/037553—ISA/EPO—Oct. 17, 2024.

* cited by examiner

*Primary Examiner* — Charles T Shedrick

(57) ABSTRACT

Certain aspects of the present disclosure provide techniques for access stratum level security of medium access control (MAC) transport blocks (TBs). A method for wireless communications includes generating a unique ciphering sequence number for each MAC TB of a plurality of MAC TBs. The method includes encrypting each of the plurality of MAC TBs based, in part, on the unique ciphering sequence number for each of the plurality of MAC TBs.

24 Claims, 12 Drawing Sheets

One Frame (TDD)
10 ms
400
subframe
RB
slot
D D D D D D D D D D D D X U
subcarrier
OFDM symbol
slot
DMRS Rx
CSI-RS 430
PDCCH
SSS
PSS
PDSCH
PBCH
20 RBs
SS/PBCH Block system bandwidth RBs
One Frame (TDD)
10 ms
450
subframe
RB
slot
D X U U U U U U U U U U U U
subcarrier
PUCCH
PUSCH
SRS Comb 0
SRS Comb 1
OFDM symbol
slot
SRS
DMRS R

480

ACCESS STRATUM SECURITY FOR MEDIUM ACCESS CONTROL TRANSPORT BLOCKS

BACKGROUND

Field of the Disclosure

Aspects of the present disclosure relate to wireless communications, and more particularly, to techniques for security for medium access control (MAC) transport blocks (TBs).

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication. The method includes generating a unique ciphering sequence number for each MAC TB of a plurality of MAC TBs. The method includes encrypting each of the plurality of MAC TBs based, in part, on the unique ciphering sequence number for each of the plurality of MAC TBs.

Another aspect provides a method for wireless communication. The method includes obtaining a plurality of MAC TBs. The method includes decrypting each of the plurality of MAC TBs based, in part, on a unique ciphering sequence number for each of the plurality of MAC TBs.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
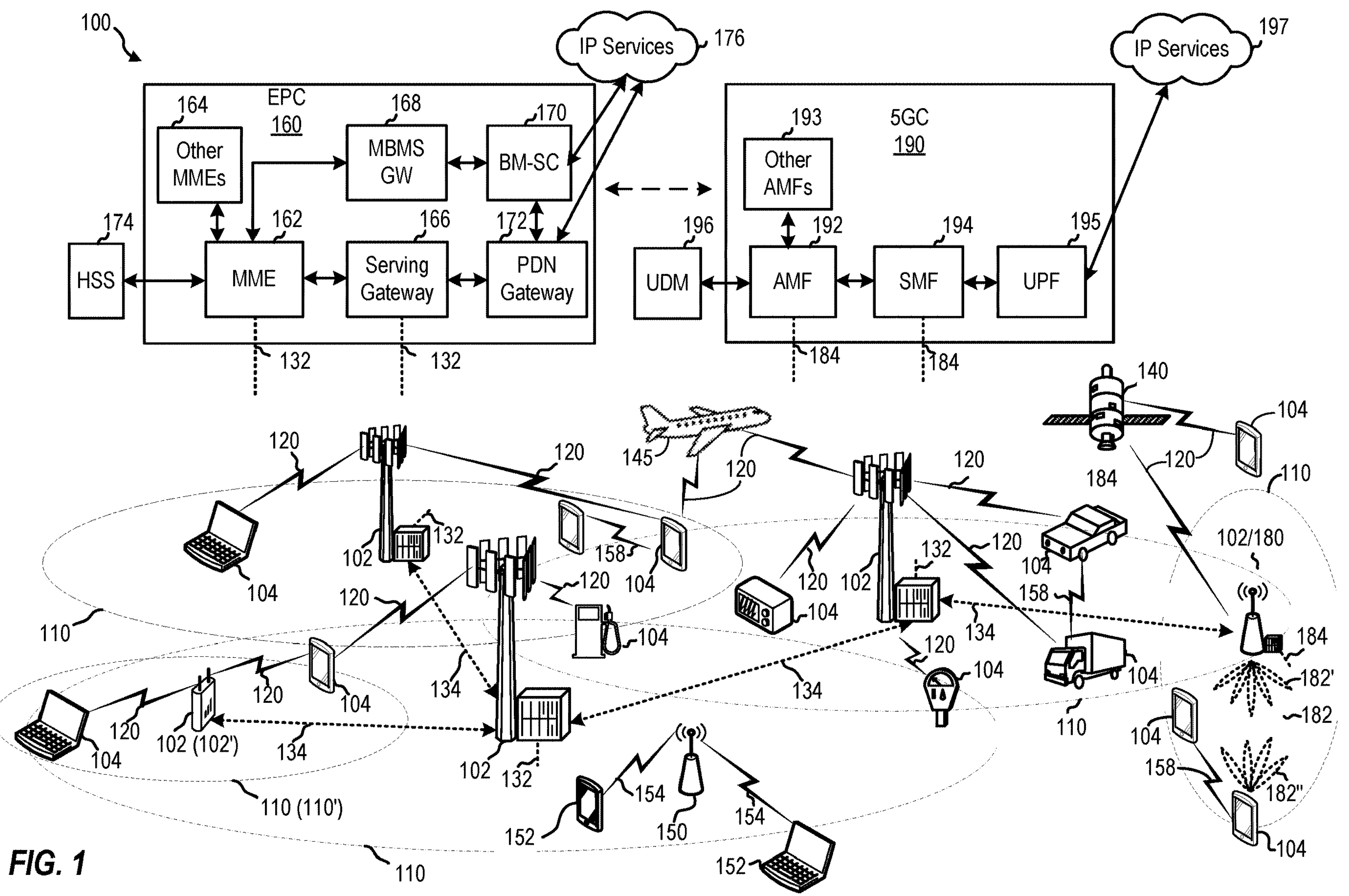
FIG. 1 depicts an example wireless communications network.

Aspects of the present disclosure provide apparatuses, methods, processing systems, and computer-readable mediums for access stratum (AS) level security for MAC TBs.

In wireless communication systems, radio protocol includes the non-access stratum (NAS) layer, the AS layer, the radio resource control (RRC) protocol layer, the MAC layer, the radio link control (RLC) layer, and the packet data convergence protocol (PDCP) layer.

The NAS layer is responsible for handling signaling and control messages between user equipment (UE) and the core network (CN). The NAS layer may handle functions such as authentication, security, session management, mobility management, and network access control. The NAS layer may be implemented in both the UE and the core network.

The AS layer sit above the physical layer and below the NAS layer and bearer levels. In the context of the 3GPP wireless communication standard, the AS level is responsible for providing radio resource control and management functions between the UE and the base station (BS). The AS layer is implemented in both the UE and the base station (BS).

The PHY layer is responsible for the transmission and reception of data over the air interface. The PHY layer handles functions such as modulation, coding, and transmission power control.

The bearer level is responsible for transporting user data between the UE and the core network. The bearer level is part of the radio access network (RAN) protocol architecture. The bearer level also provides quality of service (QoS) management, which ensures that the UE receives the necessary network resources to meet the required performance criteria for the particular service.

The RRC layer manages the establishment, maintenance, and release of radio connections between the UE and the RAN. The RRC layer handles tasks such as cell selection, handover, power control, and broadcast of system information.

The MAC layer is responsible for managing access to the shared radio channel and handles functions such as scheduling, resource allocation, and prioritization of data traffic. The MAC layer provides the physical layer with access to the shared medium by defining protocols for transmitting and receiving data over the air interface. The MAC layer implements functions such as channel allocation, channel coding, and channel access control. The MAC layer also handles error control, retransmissions, and flow control. The MAC layer is implemented in both the UE and the BS.

MAC packet data units (PDUs) carry higher-layer protocol data and control information encapsulated therein. MAC transport blocks (TBs) represent a fixed-size block of data that is delivered as a single unit from the higher layers to the MAC layer for transmission over the air interface. The MAC layer may perform segmentation and concatenation of MAC TBs to form MAC PDUs, which are then transmitted over the air interface.

The RLC layer is responsible for segmentation and reassembly of user data into RLC PDUs for transmission over the air interface for transmission over the air interface. The RLC layer also handles functions such as error detection and recovery, and flow control.

The PDCP layer is responsible for compression and decompression of user data to minimize the amount of data transmitted over the air interface. PDCP PDUs encapsulate data and control information for transmission over the air interface. The PDCP layer also handles functions such as security and header compression. PDCP layer may include service data adaptation protocol (SDAP) that is responsible for adapting service data provided by upper-layer protocols to the specific requirements of the underlying radio interface, such as QoS mapping, packet filtering, header compression, and flow control.

Some wireless communication systems, such as long term evolution (LTE) and fifth generation new radio (5G NR) systems, do not provide security for the whole MAC PDU and contain unprotected critical information in MAC PDUs. For example, these wireless communication system may provide security for PDCP data PDUs, RLC data PDUs, and certain MAC CEs, but does not provide security for the PDCP control PDUs, RLC control PDUs, and other MAC CEs.

Unprotected information may be vulnerable to attacks, such as a man-in-the-middle (MitM) attack. In a MitM attack, an attacker intercepts and potentially modifies the communication between entities. For example, an attacker may gain access to the network path between a sender and receiver and alter the content of packets before forwarding the packets to the intended recipient, making it appear as if the packets were sent by the original sender.

An attacker can manipulated the unprotected information to degrade or disrupt the radio link. For example, an attacker can manipulate a MAC CE carrying a buffer status report (BSR) to interfere with uplink scheduling. As another example, an attacker can manipulate a MAC CE carrying a timing advance command (TAC) to cause desynchronization. As yet another example, an attacker can manipulate a MAC CE carrying a transmission configuration indication (TCI) state activation or deactivation to cause beam and/or precoding failure. If the TCI state for a physical downlink control channel (PDCCH) or a physical downlink shared channel (PDSCH) is alerted by an attacker, the UE will not be able to receive control or data messages from the BS because a mismatch between the transmit beam used by the BS and receive beam used by the UE. If yet another example, an attacker can manipulate a MAC CE carrying a secondary cell (SCell) activation or deactivation to affect UE tracking.

Accordingly, what is needed are techniques for protecting the whole MAC TB (a MAC TB is a combination of MAC CEs and RLC PDUs, and each RLC PDU is a PDCP data or control PDU), including security for PDCP control PDUs, RLC control PDUs, and all MAC CEs.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a UE, a BS, a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
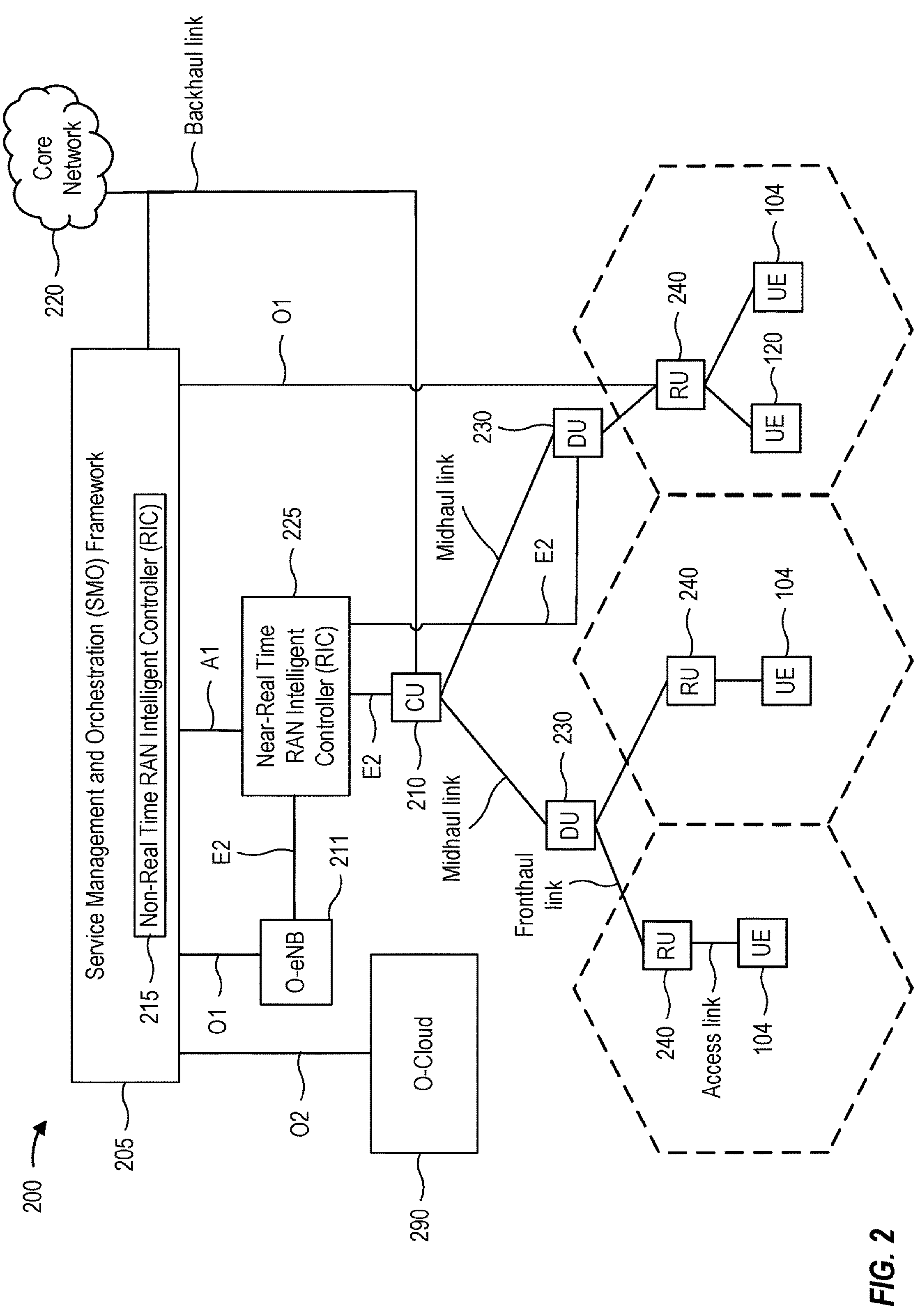
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the El interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an Al interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
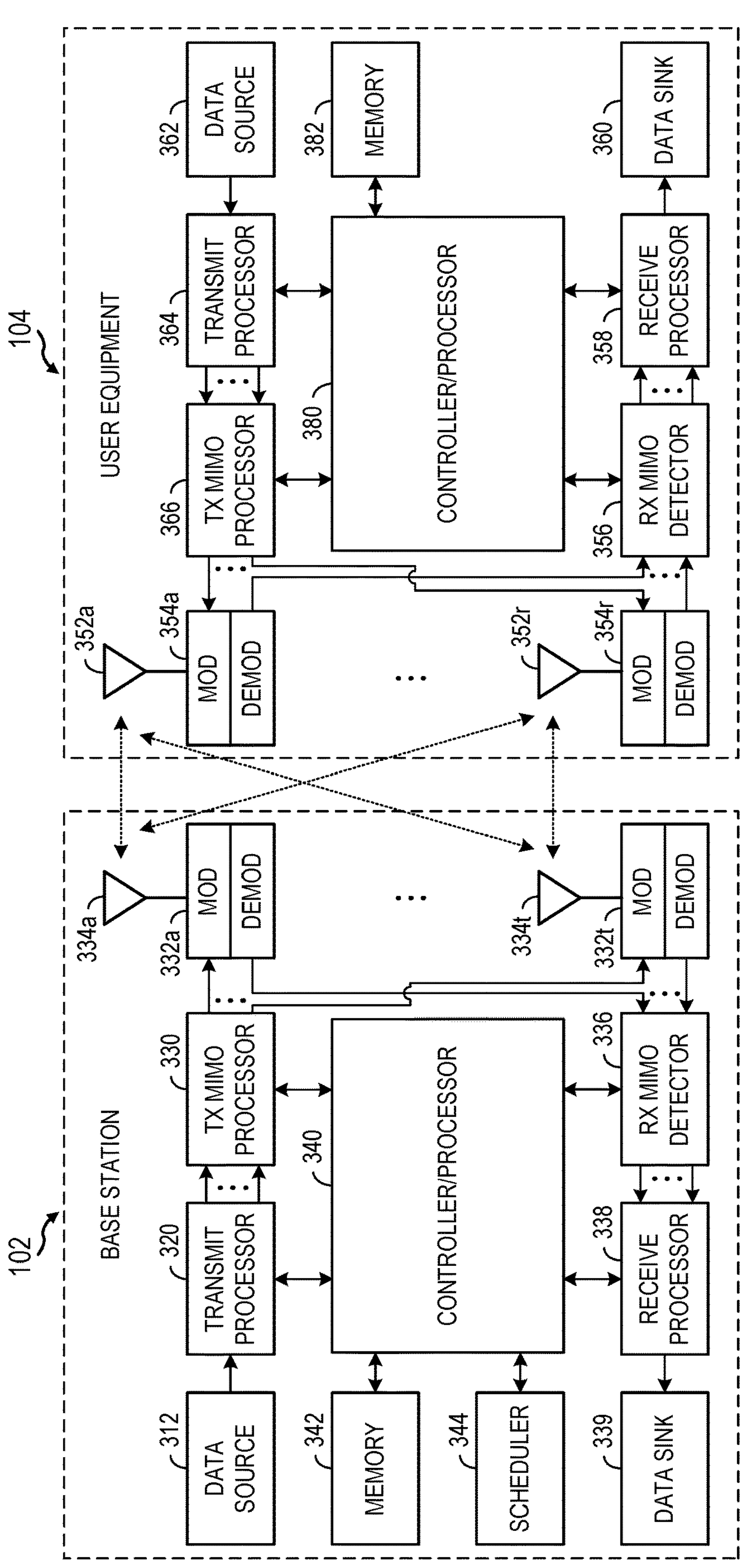
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), PDCCH, group common PDCCH (GC PDCCH), and/or others. The data may be for the PDSCH, in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t,* detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts. "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
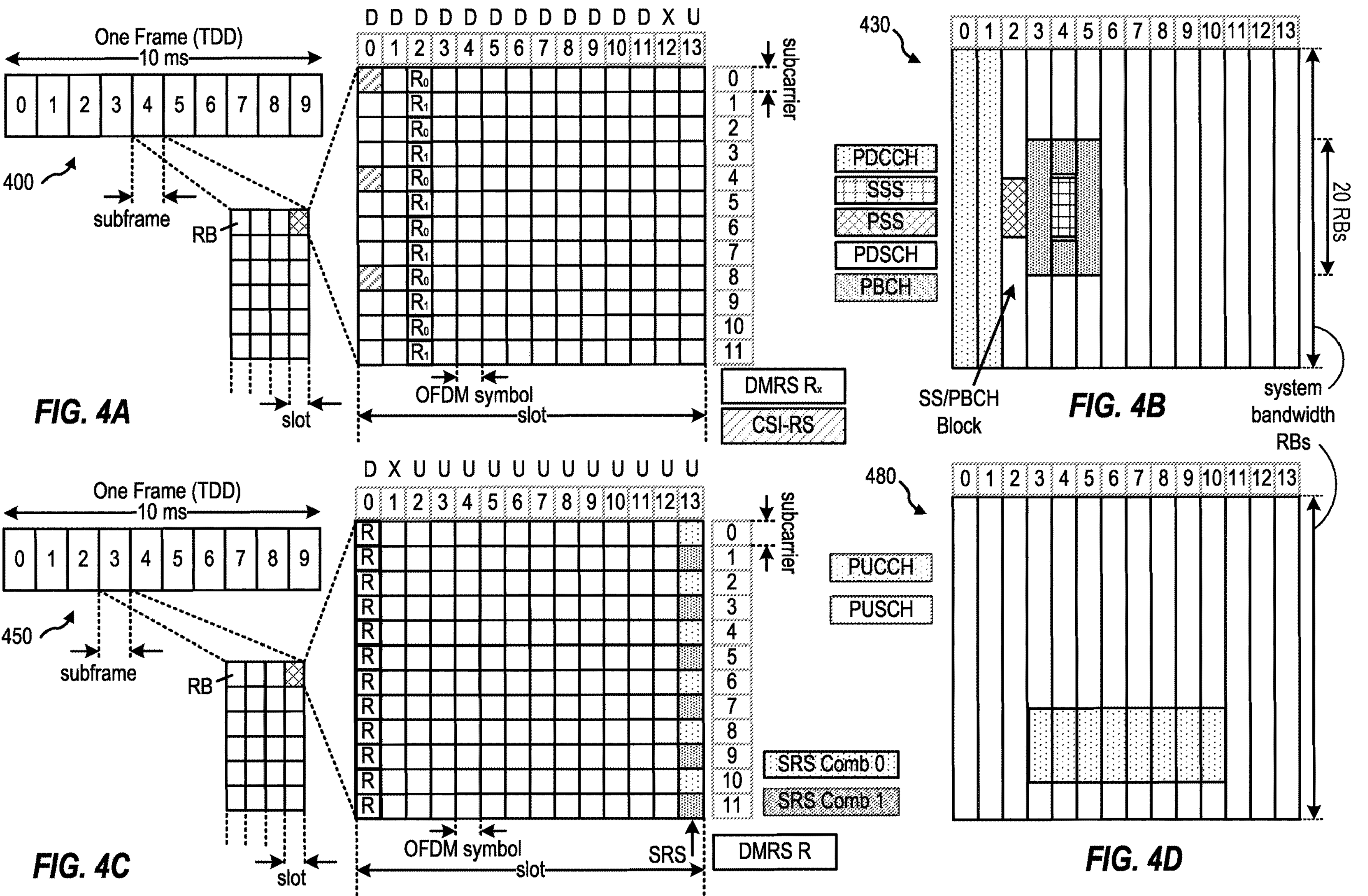
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIG. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}\times15$ kHz, where $\mu$ is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to AS Security for MAC TBs

In 5G networks (e.g., such as wireless communication network 100), the RAN architecture across services, radio access technologies (RATs), access types, and backhaul types. A UE (e.g., such as a UE 104) may be configured with a set of security contexts. For example, the UE may have a security context for PHY/MAC security between the UE and the RAN (e.g., between the UE and a DU, a remote unit (RU), IAB, Relay, PC5 device, or WLAN device). The UE may have a security context for AS/PDCP security between the UE and the core network (e.g., between the UE and CU). The UE have a security context for NAS security between the UE and a CNF. The UE may have a security context for Application/service level security between the UE and cloud or edge applications. In some deployments, such services include vertical services such as location services, voice services, edges services, extended reality (XR) services, internet services and horizontal services such as secure context storage services, security policy services, security services (e.g., authentication, key establishment, and key distribution services), mobility services (e.g., paging and location update services), and transport services (e.g., location user-plane security anchor services and prepare user plane security context services).

As discussed herein, current 5G wireless communication systems may provide security for PDCP data PDUs, RLC data PDUs, and certain MAC CEs, but do not provide security for the PDCP control PDUs, RLC control PDUs, and other MAC CEs. In addition, current security may be at the bearer level and, therefore, the security configuration may vary per-bearer.

Figure 5:
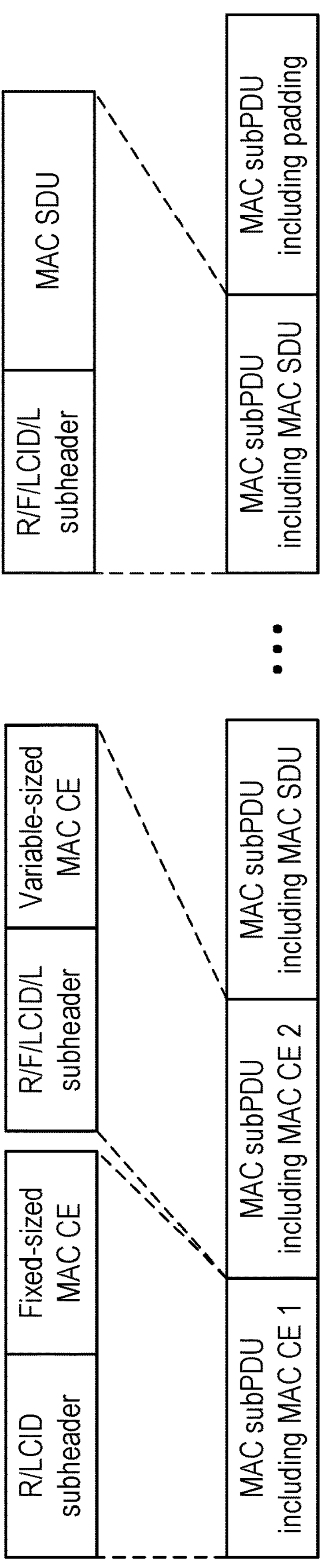
FIG. 5 depicts an example downlink MAC protocol data unit (PDU).
Figure 6:
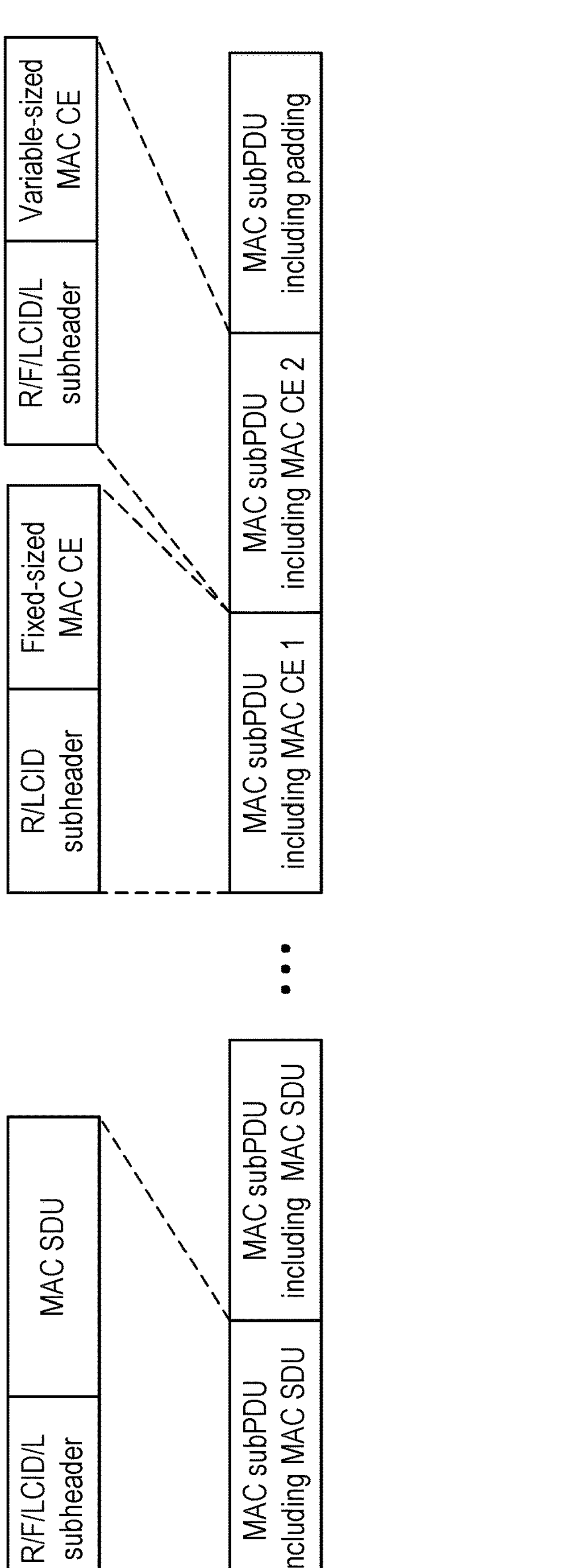
FIG. 6 depicts an example uplink MAC PDU.

FIG. 5 depicts an example downlink MAC PDU and FIG. 6 depicts an example uplink MAC PDU. As shown, a MAC PDU may include one or more MAC subPDUs containing one or more header fields, a MAC service data unit (SDU), one or more CEs, and padding. MAC CEs may include BSR MAC CEs, cell radio network temporary identifier (C-RNTI) MAC CEs, UE contention resolution identity MAC CEs, TAC MAC CEs, absolute TAC MAC CEs, discontinuous reception (DRX) command MAC CEs, long DRX command MAC CEs, configured grant confirmation MAC CEs, single entry power headroom report (PHR) MAC CEs, multiple entry PHR MAC CES, SCell activation/deactivation MAC CEs, duplication activation/deactivation MAC CEs, semi-persistent (SP) CSI-RS/CSI interference management (IM) resource set activation/deactivation MAC CEs, aperiodic CSI trigger state subselection MAC CEs, TCI state activation/deactivation for UE-specific PDSCH MAC CEs, TCI state indication for UE-specific PDCCH MAC CEs, SP CSI reporting on PUCCH activation/deactivation MAC CEs, SP SRS activation/deactivation MAC CEs, PUCCH spatial relation activation/deactivation MAC CEs, SP zero power (ZP) CSI-RS resource set activation/deactivation MAC CEs, recommended bit rate MAC CEs, timing delta MAC CEs, guard symbols MAC CEs, beam failure recovery (BFR) MAC CEs, enhanced TCI states activation/deactivation for UE-specific PDSCH MAC CEs, enhanced PUCCH spatial relation activation/deactivation MAC CEs, enhanced SP/AP spatial relation indication MAC CEs, SRS pathloss reference RS update MAC CEs, PUSCH pathloss reference RS update MAC CEs, serving cell set based SRS spatial relation indication MAC CEs, listen-before-talk (LBT) failure MAC CEs, multiple entry configured grant confirmation MAC CEs, duplication RLC activation/deactivation MAC CEs, sidelink BSR MAC CEs, sidelink configured grant confirmation MAC CEs, sidelink CSI reporting MAC CEs, SP positioning SRS activation/deactivation MAC CEs, guard symbols MAC CEs, timing advance offset MAC CEs, timing request MAC CEs, positioning measurement gap activation/deactivation request MAC CEs, positioning measurement gap activation/deactivation command MAC CEs, PPW activation/deactivation command MAC CEs, enhanced BFR MAC CEs, enhanced TCI states indication for UE-specific PDCCH MAC CEs, PUCCH spatial relation activation/deactivation for multiple TRP PUCCH repetition MAC CEs, PUCCH power control set update for multiple TRP PUCCH repetition MAC CEs, unified TCI states activation/deactivation MAC CEs, enhanced single entry PHR MAC CEs, enhanced multiple entry PHR MAC CES, enhanced single entry PHR for multiple TRP MAC CEs, enhanced multiple entry PHR for multiple TRP MAC CEs, sidelink DRX command MAC CEs, inter-UE coordination information MAC CEs, inter-UE coordination request MAC CEs, enhanced SCell activation/deactivation MAC CEs, timing advance report MAC CEs, differential Koffset MAC CEs, beam failure detection (BFD) RS indication MAC CEs, SP/AP SRS TCI state indication MAC CEs, serving cell set based SRS TCI state indication MAC CEs, child IAB-DU restricted beam indication MAC CEs, IAB-MT recommended beam indication MAC CEs, DL TX power adjustment and desired DL TX power adjustment MAC CEs, desired IAB-MT PSD range MAC CEs, timing case indication MAC CEs, and/or other MAC CEs.

In some aspects, a secure MAC security CE, carried in a MAC PDU, includes a MAC sequence number. The MAC SN may be indicated by a least significant bit (LSB) of an UL/DL MAC PDU count value. The MAC SN may initialized when the key $K_{MAC}$ is derived. The MAC security CE may indicate a MAC security protection type. For example, the MAC security CE may indicate security for the MAC PDU or security for individual MAC subPDUs. The MAC security CE may indicate additional parameters, such as a total length of the MAC PDU, a number of MAC subPDUs including MAC CEs, a length of MAC subPDUs.

In some aspects, MAC security terminates at the DU. The DU may expose a service-based interface to services in a cloud.

In some aspects, the network may indicate support and activation of MAC TB protection. For example, the network may indicate support and activation of MAC TB protection via RRC signaling, such as in an RRC reconfiguration message. The network may indication support for protection of an entire MAC PDU, of individual MAC subPDUs, or of MAC CEs only.

In some aspects, a $K_{DU}$ is derived from $K_{SECSVC}$ according to a key derivation function (KDF), where $K_{DU}$=KDF ($K_{SECSVC}$, parameter(s)), wherein the parameter(s) are one or more KDF parameters such as cell identifier (ID), a random value, a counter value, or a MAC key. Two keys, a MAC encryption key $K_{MACEnc}$ and a MAC integrity key $K_{MACInt}$ can be derived from the $K_{DU}$ using an algorithm ID as input, where the algorithm ID identifies a ciphering and/or an integrity algorithm used for the derivation. For example, a ciphering algorithm may input parameters including a 128-bit cipher key (KEY), a 32-bit COUNT-C, a 5-bit bearer identity (BEARER, e.g., a logical channel ID), a 1-bit direction of the transmission (DIRECTION, e.g., 0 for uplink and 1 for downlink), and a length of the keystream required (LENGTH). Based on the input parameters the ciphering algorithm generates an output keystream block (KEYSTREAM) which is used to encrypt the input plaintext block (PLAINTEXT) to produce the output ciphertext block (CIPHERTEXT).

An integrity algorithm may use a 128-bit integrity key (KEY), COUNT, BEARER, DIRECTION, and the message itself (MESSAGE). Based on these input parameters, the sender may compute a message authentication code appended to the message when sent. For integrity protection, the receiver computes the expected message authentication code on the message received in the same way as the sender computed its message authentication code on the message sent and verifies the data integrity of the message by comparing it to the received message authentication code.

In some aspects, multiple DUs are prepared simultaneously to reduce latency in cell changes (e.g., due to failover, cell reselection, or forward handover). A mobility service may determine the candidate cells to be prepared based on a mobility pattern of the UE. In some aspects, a key refresh procedure can be performed to refresh the security keys. For example, the keys may be refreshed locally for horizontal security or the keys may be refreshed by a security service for vertical security. In some aspects, a security service can perform a rekeying procedure to derive a new $K_{DU}$.

Figure 7:
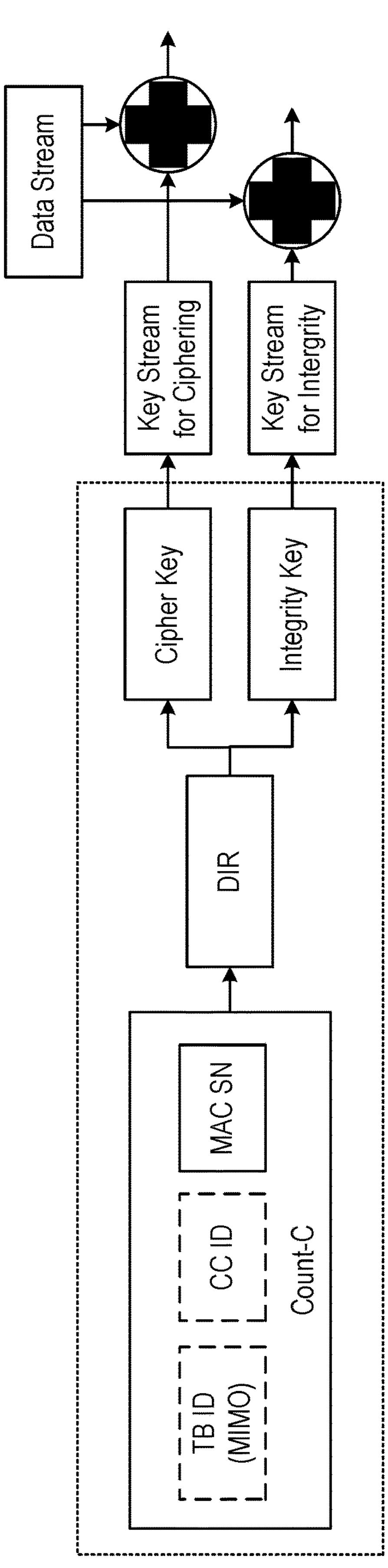
FIG. 7 depicts example encryption of MAC TBs with a unique ciphering sequence number for each MAC TB.

FIG. 7 depicts an example encryption algorithm 700 of MAC TBs with a unique ciphering sequence number for each MAC TB. As shown in FIG. 7, in order to provide security for MAC TBs, a unique Count-C and key set may generated for each MAC TB. The key set may include a cyphering key (CK) and an integrity key (IK). The CK and IK may be used for authentication.

Count-C is a security parameter (ciphering sequence number) that may be used for authentication and key generation. According to aspects of the present disclosure, every MAC TB is uniquely identified by a unique Count-C and key set within one a cell group and a unique key set across cell groups.

A cell group may refers to a collection of cells in the wireless communication network that are configured and managed together as a single unit. The cells within a cell group may share the same frequency band and physical characteristics, such as maximum transmit power and antenna configuration. Cell groups may be useful for load balancing. handover management, power control, frequency hopping, and beamforming. By grouping cells together, the network can optimize the allocation of radio resources and reduce interference between cells, which can improve the overall performance and capacity of the network. In a heterogeneous network where cells of different sizes and capabilities are deployed, cell groups can be used to coordinate the transmission and reception of signals between different types of cells, which can improve the coverage and capacity of the network. In some cases, cell groups include master cell groups (MCGs) and secondary cell group (SCGs).

As shown in FIG. 7, the Count-C is generated based on a MAC sequence number (SN). The MAC SN is incremented for each MAC TB generated. Accordingly, each MAC TB has a unique MAC SN for generating a unique Count-C within the cell group. The MAC-SN may be included in the encrypted MAC PDU.

As shown in FIG. 7, the Count-C may be generated further based on a component carrier (CC) ID to provide a Count-C that uniquely identifies the MAC TB both within the cell group and also across CCs. While a cell group may have one MAC entity and each MAC TB can have a unique MAC-SN specific to the cell group, the may be multiple CC IDs in the cell group (e.g., five CCs in an MCG). Thus, use of the CC ID to generate the Count-C allows the MAC TB to be uniquely identified within a CC in the cell group.

As shown in FIG. 7, the Count-C may be generated further based on a TB ID to provide a Count-C that uniquely identifies the MAC TB both within the cell group and within a MIMO transmission.

In some aspects, a MAC TB first transmission frame number can be used to generate the Count-C in place of the MAC-SN. In some examples, the MAC TB first transmission frame number is used when the MAC TB contents cannot be changed across HARQ retransmissions.

As shown in FIG. 7, the Count-C. DIR CK, KEYSTREAM for ciphering, and data stream, are used in an XOR operation to generate the ciphered output. The Count-C, DIR, IK, KEYSTREAM for integrity, and data stream, are used in an XOR operation to generate the integrity output. In some aspects, the CK and IK are configured by the network. The CK and IK are cell-specific (e.g., different key sets for MCG and SCG). Accordingly, the CK and IK may be configured per cell. In some aspects, multiple keys are configured and the specific keys to use are indicated by the network during cell change.

In some aspects, a range of valid MAC SN values may be defined. If a MAC PDU contains a MAC SN outside of the valid range of MAC SN, the receiver will not decode and deliver the MAC PDU. The range of valid MAC SN values may be specified per cell group or per MAC entity. In some example, to avoid replay issues, a maximum MAC SN value is smaller than a latest received value X and window [X-Win, X]. The window may depend on a HARQ retransmission configuration. For example, the window may be 64 or 128 depending on a retransmission latency, a number of HARQ processes, and a number of HARQ retransmissions. In some aspects, the range of valid MAC SN values is configured by the network.

In some aspects, when a first transmission frame number is used to generate the Count-C, then the maximum number of retransmissions or a maximum retransmission duration may be specified. The maximum number of retransmissions or duration may be specified by the network. The maximum number of retransmissions or duration may be a fixed value derived by the UE. Any retransmission past the maximum can be dropped.

In some aspects, the MAC security is negotiated. For the example, the UE and a network entity may negotiate the MAC security to be used. In some cases, only security for MAC CEs is negotiated. In some cases, only security for MAC and secondary radio bearers (SRBs) is negotiated. In this case, the whole MAC TB on SRBs. In some cases, security for SRBs and dedicated radio bearer (DRB) is negotiated. In this case, everything is always protected (e.g., the whole MAC TB on SRBs and DRB).

In some aspects, the security contexts (including security key management) are managed by a CP-CU (control plane control unit) or DU. In some aspects, the security contexts by the UPSAF (user plane security association function).

Per packet ciphering, deciphering, and integrity check is expensive with large overhead. This overhead increases as data rates become larger (e.g., 10 Gbps rates in 5G to 100 Gbps rates expected in 6G). With MAC based security, the number of operations may be directly proportional to the number of CCs and the number of HARQ processes (and, for a DU, the number of UEs), rather than dependent on the TB size or data rate and, therefore, the overhead for the MAC security is smaller. From the DU perspective,

Example Operations of Entities in a Communications Network

Figure 8:
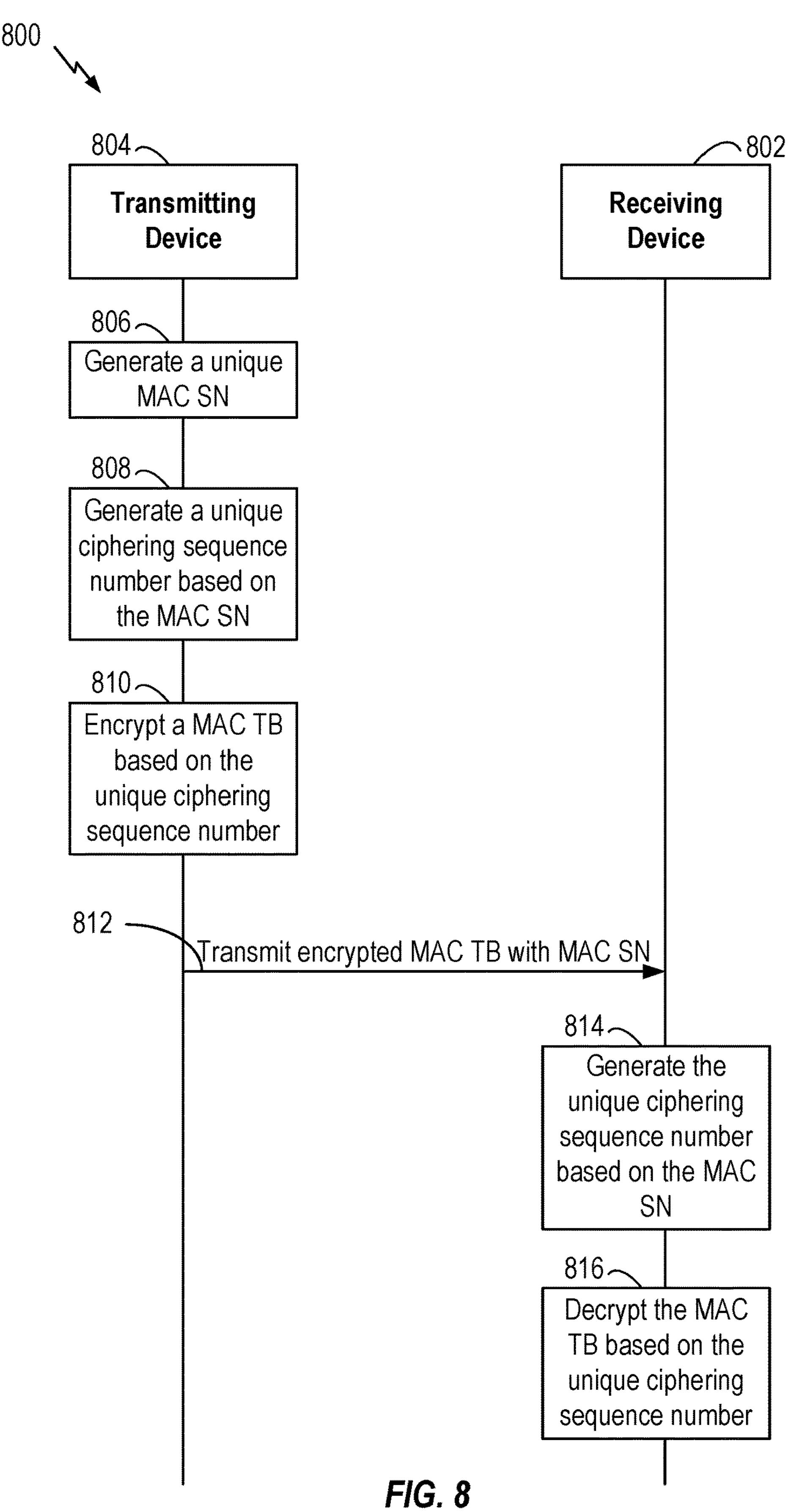
FIG. 8 depicts a process flow for communications in a network between a transmitting device that transmits encrypted MAC TBs and a receiving device that decrypts the encrypted MAC TBs.

FIG. 8 depicts a process flow 800 for communications in a network between a transmitting device 804 and a receiving device 802. In some aspects, the transmitting device 804 may be an example of the BS 102 (for downlink) depicted and described with respect to FIGS. 1 and 3 or a disaggregated base station depicted and described with respect to FIG. 2 or a UE 104 (for uplink or sidelink) depicted and described with respect to FIGS. 1 and 3. In some aspects, the receiving device 802 may be an example of the BS 102 (for uplink) depicted and described with respect to FIGS. 1 and 3 or a disaggregated base station depicted and described with respect to FIG. 2 or a UE 104 (for downlink or sidelink) depicted and described with respect to FIGS. 1 and 3. However, in other aspects, transmitting device 804 and receiving device 802 may be another type of wireless communications device, such as those described herein.

As shown in FIG. 8, at step 806, the transmitting device 804 generates a unique MAC SN. For example, the transmitting device 804 may increment a MAC SN value for each MAC TB generated by the transmitting device 804.

At step 808, the transmitting device 804 generates a unique ciphering sequence number based on the MAC SN. For example, the transmitting device 804 may generate a Count-C for each MAC TB that uniquely identifies the MAC TB within a cell group. In some aspects, the transmitting device 804 generates the Count-C for each MAC TB further based on a CC ID and/or a TB ID to uniquely identify the MAC TB on a CC within the cell group and/or to uniquely identify the TB within a MIMO transmission, respectively.

At step 810, the transmitting device 804 encrypts each MAC TB based on the unique ciphering sequence number for the MAC TB. In some aspects, the transmitting device 804 encrypts each MAC TB based on a cell-specific unique key set, including a CK and IK.

At step 812, the transmitting device 804 outputs each encrypted MAC TB with the respective MAC SN to the receiving device 802. For example, the transmitting device 804 transmits the encrypted MAC TBs in MAC PDUs containing a MAC security CE that includes the MAC SN.

At step 814, the receiving device 802 generates the unique ciphering sequence number based on the MAC SN received with the MAC TBs.

At step 814, the receiving device 802 decrypts the MAC TBs based on the unique ciphering sequence number.

Example Operations of a Transmitting Device

Figure 9:
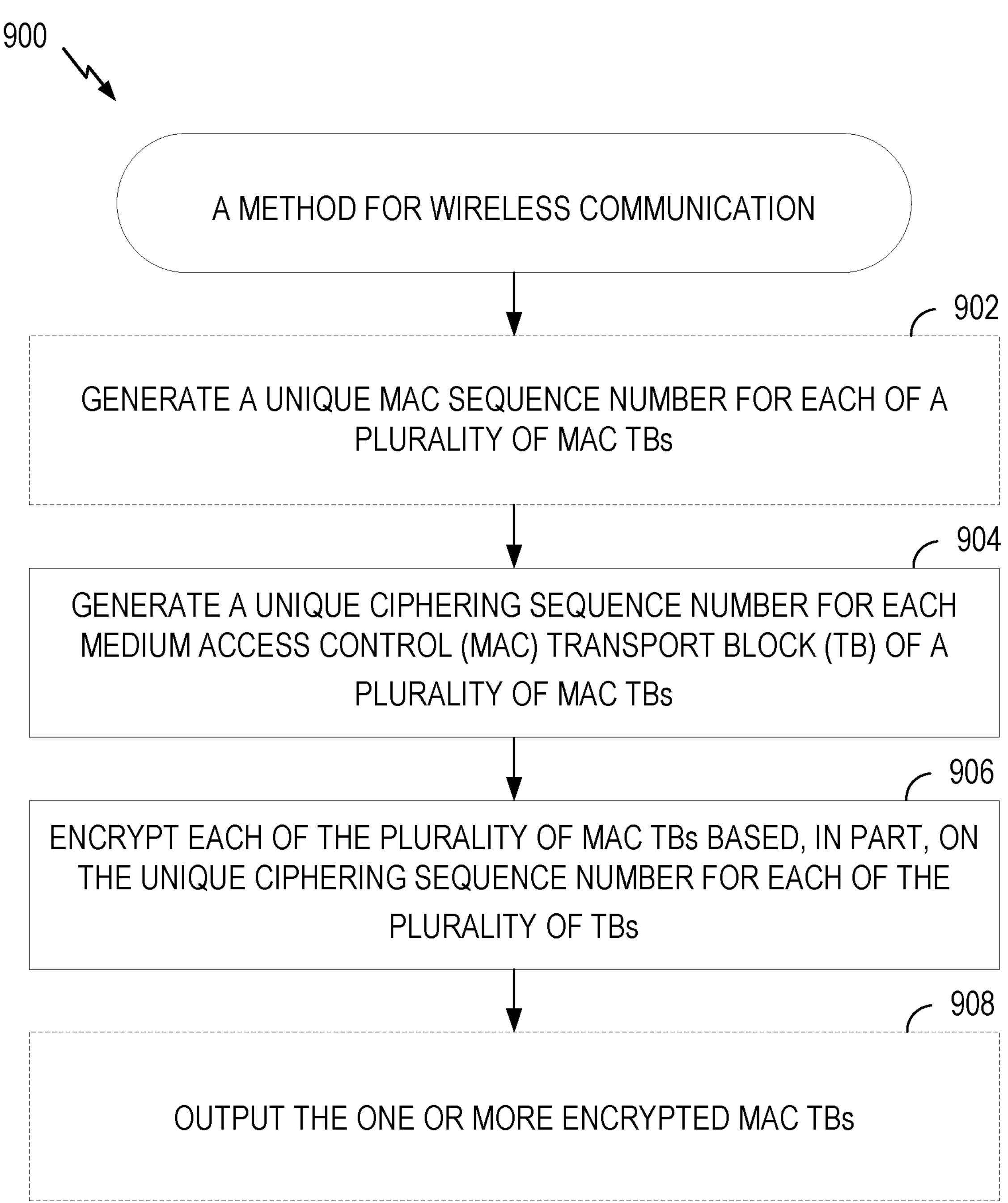
FIG. 9 depicts a method for wireless communications by a transmitting device.

FIG. 9 shows a method 900 for wireless communications by a UE, such as UE 104 of FIGS. 1 and 3.

Optionally, method 900 begins at operation 902 with generating a unique MAC SN for each MAC TB of a plurality of MAC TBs. In one aspect, the MAC SN is unique to a cell group.

In one aspect, method 900 further includes outputting or obtaining a RRC reconfiguration message indicating a network entity supports MAC TB encryption, indicating activation of MAC TB encryption, or a combination thereof, wherein the encrypting the one or more MAC TBs is in response to the indication.

At operation 904, the method 900 includes generating a unique ciphering sequence number for each MAC TB of a plurality of MAC TBs. In one aspect, the ciphering sequence number comprises a COUNT-C value. In one aspect, the generating the unique ciphering sequence number, at operation 904, includes generating the unique ciphering sequence number for each of the plurality of MAC TBs based on the MAC SN generated for the MAC TB.

In one aspect, the generating the unique ciphering sequence number, at operation 904, includes generating the unique ciphering sequence number for each of the plurality of MAC TBs further based on a CC ID for the MAC TB. In one aspect, the CC ID uniquely identifies the MAC TB across CCs within a cell group.

In one aspect, the generating the unique ciphering sequence number, at operation 904, includes generating the unique ciphering sequence number for each of the plurality of MAC TBs further based on a TB identifier for the MAC TB. In one aspect, the TB ID uniquely identifies the MAC TB within a MIMO transmission on a CC within a cell group.

In one aspect, the generating the unique ciphering sequence number, at operation 904, includes generating the unique ciphering sequence number for each of the plurality of MAC TBs further based on a first transmission frame number for the MAC TB. In one aspect, a range of valid MAC-SN values are specified for the cell group.

Method 900 then proceeds to operation 906 with encrypting each of the plurality of MAC TBs based, in part, on the unique ciphering sequence number for each of the plurality of MAC TBs.

In one aspect, the encrypting each of the plurality of MAC TBs, operation 906, includes encrypting each of the plurality of MAC TBs using one or more encryption keys. In one aspect, the one or more encryption keys are unique within a cell group. In one aspect, the one or more encryption keys comprise a CK, an IK, or both the CK and the IK. In one aspect, the one or more encryption keys are cell-specific.

In one aspect, a plurality of encryption keys and the method 900 further includes receiving signaling, during a cell change, indicating the one or more encryption keys, from the plurality of encryption keys, to be used in the cell.

In one aspect, the plurality of MAC TBs comprises one or more MAC PDUs including one or more RLC control PDUs, one or more PDCP control PDUs, one or more BSR MAC CEs, one or more TAC MAC CEs, one or more TCI state activation MAC CEs, one or more TCI state deactivation MAC CEs, one or more SCell activation MAC CEs, one or more SCell deactivation MAC CEs, or a combination thereof.

In one aspect, each MAC PDU further comprises a MAC security CE including the MAC CN. In one aspect, the MAC security CE further includes an indication of a MAC security protection type. In one aspect, the MAC security is configured by a base station, a core network entity, or a user plane security for application function (UPSAF).

In one aspect, method 900 further includes, at operation 908, outputting the one or more encrypted MAC TBs.

Figure 11:
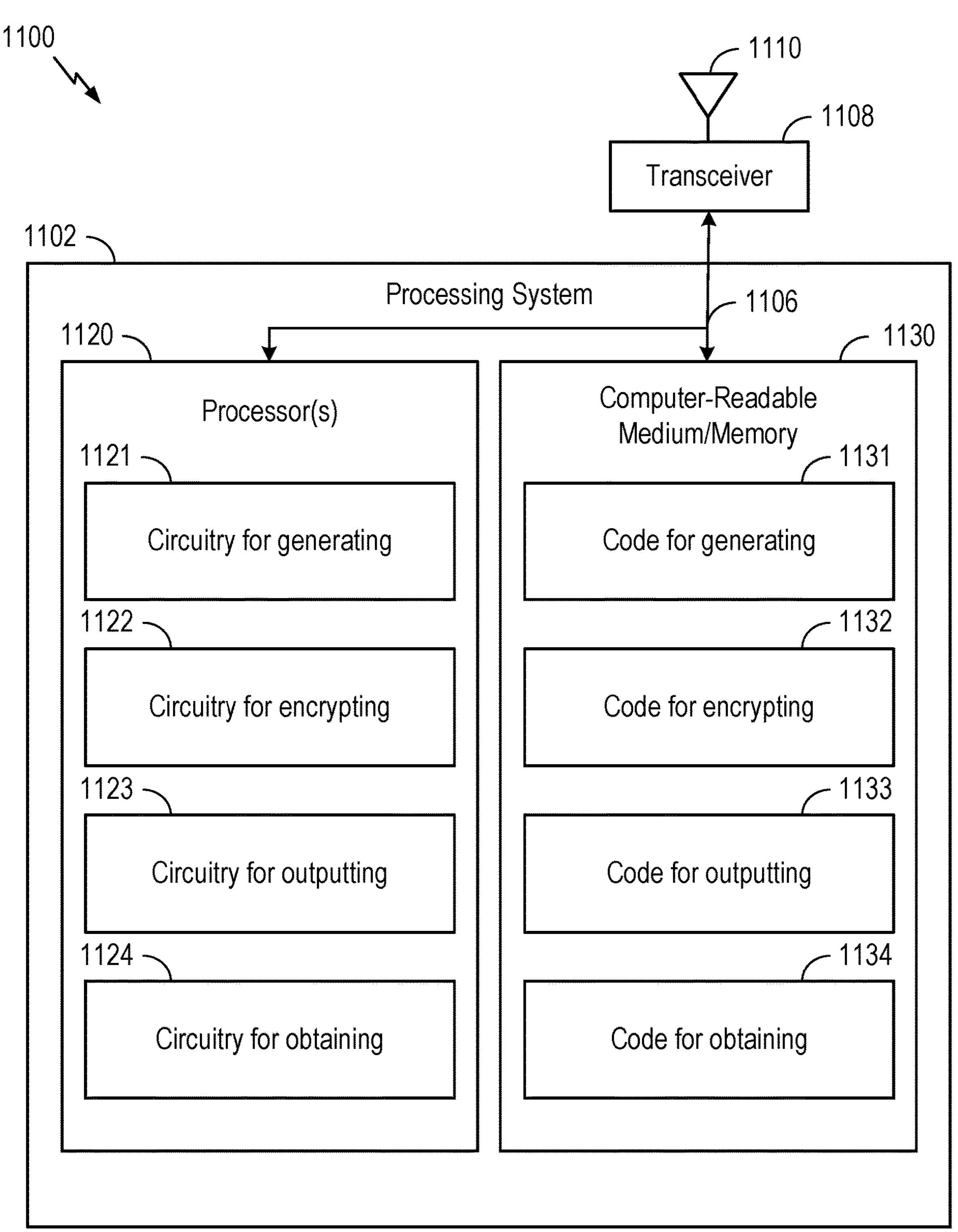
FIG. 11 depicts aspects of an example communications device that transmits encrypted MAC TBs.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Operations of a Receiving Device

Figure 10:
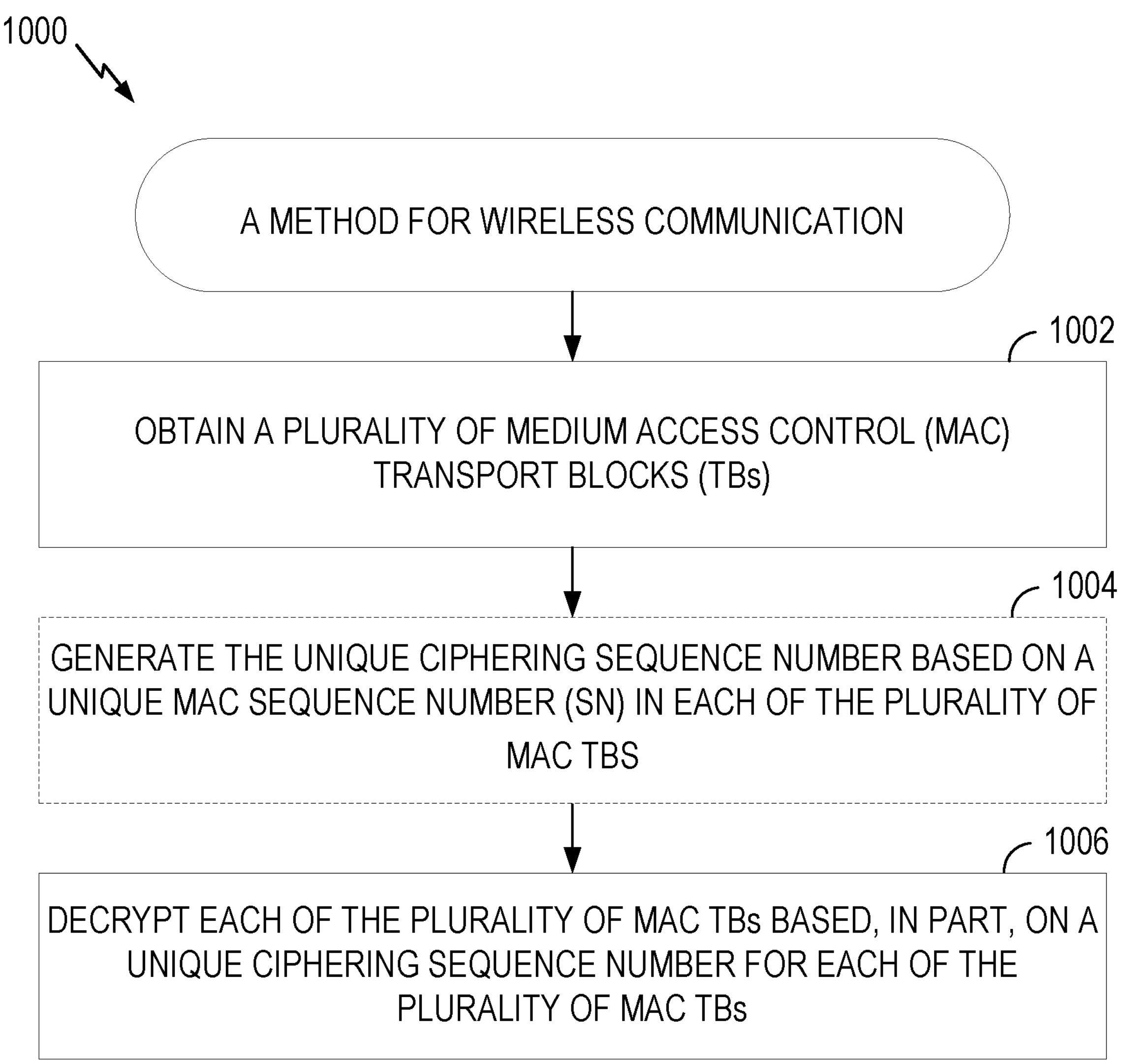
FIG. 10 depicts a method for wireless communications by a receiving device.

FIG. 10 shows a method 1000 for wireless communications by a network entity, such as BS 102 of FIGS. 1 and 3, or a disaggregated base station as discussed with respect to FIG. 2.

Method 1000 begins at operation 1002 with obtaining a plurality of encrypted MAC TBs.

In one aspect, the plurality of MAC TBs comprises one or more MAC PDUs including one or more RLC control PDUs, one or more PDCP control PDUs, one or more BSR MAC CEs, one or more TAC MAC CEs, one or more TCI state activation MAC CEs, one or more TCI state deactivation MAC CEs, one or more SCell activation MAC CEs, one or more SCell deactivation MAC CEs, or a combination thereof.

In one aspect, method 1000 optionally includes, at operation 1004, generating a unique ciphering sequence number for each of the plurality of MAC TBs. In one aspect, the ciphering sequence number comprises a COUNT-C value.

In one aspect, the plurality of MAC TBs are received in a plurality of MAC PDUs. In one aspect, the MAC PDUs includes a unique MAC SN for each of the plurality of TBs. Generating the unique ciphering sequence number for each of the plurality of MAC TBs, at operation 1004, includes generating the unique ciphering sequence number for each MAC TB based on the MAC SN for the MAC TB. In one aspect, the MAC SN is unique to a cell group. In one aspect, a range of valid MAC-SN values are specified for the cell group.

In one aspect, the generating the unique ciphering sequence number, at operation 1004, includes generating the unique ciphering sequence number for each of the plurality of MAC TBs further based on a CC ID for the MAC TB. In one aspect, the CC ID uniquely identifies the MAC TB across CCs within a cell group.

In one aspect, the generating the unique ciphering sequence number, at operation 1004, includes generating the unique ciphering sequence number for each of the plurality of MAC TBs further based on a TB ID for the MAC TB. In one aspect, the TB ID uniquely identifies the MAC TB within a MIMO transmission on a CC within a cell group.

In one aspect, the generating the unique ciphering sequence number, at operation 1004, includes generating the unique ciphering sequence number for each of the plurality of MAC TBs based on a first transmission frame number for the MAC TB.

In one aspect, each MAC PDU further includes a MAC security CE including the MAC SN. In one aspect, the MAC security CE further includes an indication of a MAC security protection type.

Method 1000 then proceeds to operation 1006 with decrypting each of the plurality of MAC TBs based, in part, on a unique ciphering sequence number for each of the plurality of MAC TBs.

In one aspect, the decrypting each of the plurality of MAC TBs at operation 1006 includes decrypting each of the plurality of MAC TBs using one or more encryption keys. In one aspect, the one or more encryption keys are unique within a cell group. In one aspect, the one or more encryption keys comprise a CK, and IK, or both the CK and the IK. In one aspect, the one or more encryption keys are cell-specific.

In one aspect, a plurality of encryption keys are configured, and wherein the method further comprises receiving signaling, during a cell change, indicating the one or more encryption keys, from the plurality of encryption keys, to be used in the cell.

In one aspect, the MAC security is configured by a base station, a core network entity, or a UPSAF.

In one aspect, method 1000 further includes outputting or obtaining a RRC reconfiguration message indicating a network entity supports MAC TB encryption, indicating activation of MAC TB encryption, or a combination thereof.

Figure 12:
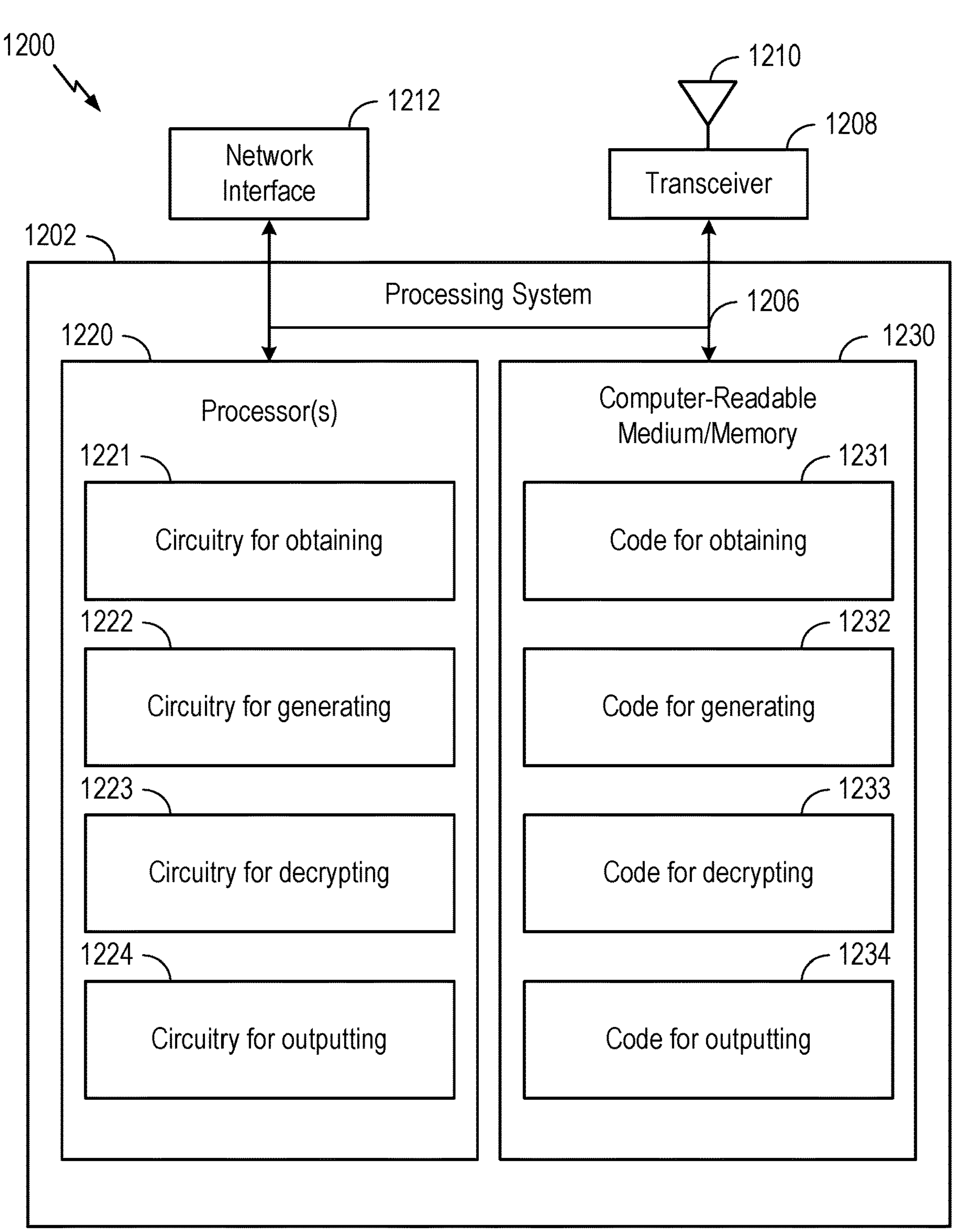
FIG. 12 depicts aspects of an example communications device that receives and decrypts encrypted MAC TBs.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Communications Devices

FIG. 11 depicts aspects of an example communications device 1100. In some aspects, communications device 1100 is a transmitting device, such as transmitting device 804 described above with respect to FIG. 8.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 358, transmit processor 364, TX MIMO processor 366, and/or controller/processor 380, as described with respect to FIG. 3. The one or more processors 1120 are coupled to a computer-readable medium/memory 1130 via a bus 1106. In certain aspects, the computer-readable medium/memory 1130 is configured to store instructions (e.g., computer-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

In the depicted example, computer-readable medium/memory 1130 stores code (e.g., executable instructions) for generating 1121, code for encrypting 1132, code for outputting 1133, and/or code for obtaining 1134. Processing of the code 1131-1134 may cause the communications device 1100 to perform the method 900 described with respect to FIG. 9, or any aspect related to it.

The one or more processors 1120 include circuitry configured to implement (e.g., execute) the code stored in the computer-readable medium/memory 1130, including circuitry for generating 1121, circuitry for encrypting 1122, circuitry for outputting 1123, and circuitry for obtaining 1124. Processing with circuitry 1121-1124 may cause the communications device 1100 to perform the method 900 described with respect to FIG. 9. or any aspect related to it.

Various components of the communications device 1100 may provide means for performing the method 900 described with respect to FIG. 9, or any aspect related to it. For example, means for transmitting, sending or outputting for transmission may include the transceivers 354 and/or antenna(s) 352 of the UE 104 illustrated in FIG. 3 and/or transceiver 1108 and antenna 1110 of the communications device 1100 in FIG. 11. Means for receiving or obtaining may include the transceivers 354 and/or antenna(s) 352 of the UE 104 illustrated in FIG. 3 and/or transceiver 1108 and antenna 1110 of the communications device 1100 in FIG. 11.

FIG. 12 depicts aspects of an example communications device. In some aspects, communications device 1200 is a transmitting device, such as transmitting device 802 of FIG. 8.

The communications device 1200 includes a processing system 1202 coupled to a transceiver 1208 (e.g., a transmitter and/or a receiver) and/or a network interface 1212. The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 2. The processing system 1202 may be configured to perform processing functions for the communications device 1200, including processing signals received and/or to be transmitted by the communications device 1200.

The processing system 1202 includes one or more processors 1220. In various aspects, one or more processors 1220 may be representative of one or more of receive processor 338, transmit processor 320, TX MIMO processor 330, and/or controller/processor 340, as described with respect to FIG. 3. The one or more processors 1220 are coupled to a computer-readable medium/memory 1230 via a bus 1206. In certain aspects, the computer-readable medium/memory 1230 is configured to store instructions (e.g., computer-executable code) that when executed by the one or more processors 1220, cause the one or more processors 1220 to perform the method 1000 described with respect to FIG. 10, or any aspect related to it. Note that reference to a processor of communications device 1200 performing a function may include one or more processors of communications device 1200 performing that function.

In the depicted example, the computer-readable medium/memory 1230 stores code (e.g., executable instructions) for obtaining 1231, code for generating 1232, code for decrypting 1233, and code for outputting 1234. Processing of the code 1231-1234 may cause the communications device 1200 to perform the method 1000 described with respect to FIG. 10, or any aspect related to it.

The one or more processors 1220 include circuitry configured to implement (e.g., execute) the code stored in the computer-readable medium/memory 1230, including circuitry for obtaining 1221, circuitry for generating 1222, circuitry for decrypting 1223, and circuitry for outputting 1224. Processing with circuitry 1221-1224 may cause the communications device 1200 to perform the method 1000 as described with respect to FIG. 10, or any aspect related to it.

Various components of the communications device 1200 may provide means for performing the method 1000 as described with respect to FIG. 10, or any aspect related to it. Means for transmitting, sending or outputting for transmission may include the transceivers 332 and/or antenna(s) 334 of the BS 102 illustrated in FIG. 3 and/or transceiver 1208 and antenna 1210 of the communications device 1200 in FIG. 12. Means for receiving or obtaining may include the transceivers 332 and/or antenna(s) 334 of the BS 102 illustrated in FIG. 3 and/or transceiver 1208 and antenna 1210 of the communications device 1200 in FIG. 12.

Example Clauses

Implementation examples are described in the following numbered clauses:

Clause 1: A method for wireless communications, comprising: generating a unique ciphering sequence number for each medium access control (MAC) transport block (TB) of a plurality of MAC TBs; and encrypting each of the plurality of MAC TBs based, in part, on the unique ciphering sequence number for each of the plurality of MAC TBs.

Clause 2: The method of Clause 1, further comprising generating a unique MAC sequence number (SN) for each of the plurality of MAC TBs, wherein the generating the unique ciphering sequence number comprises generating the unique ciphering sequence number for each of the plurality of MAC TBs based on the MAC SN generated for the MAC TB.

Clause 3: The method of Clause 2, wherein the MAC SN is unique to a cell group.

Clause 4: The method of Clause 3, wherein a range of valid MAC-SN values are specified for the cell group.

Clause 5: The method of any combination of Clauses 2-4, wherein the generating the unique ciphering sequence number comprises generating the unique ciphering sequence number for each of the plurality of MAC TBs further based on a component carrier (CC) identifier (ID) for the MAC TB.

Clause 6: The method of Clause 5, wherein the CC ID uniquely identifies the MAC TB across CCs within a cell group.

Clause 7: The method any combination of Clauses 2-6, wherein the generating the unique ciphering sequence number comprises generating the unique ciphering sequence number for each of the plurality of MAC TBs further based on a TB identifier (ID) for the MAC TB.

Clause 8: The method of Clause 7, wherein the TB ID uniquely identifies the MAC TB within a multiple-input multiple-output (MIMO) transmission on a component carrier (CC) within a cell group.

Clause 9: The method of any combination of Clauses 1-8, wherein the generating the unique ciphering sequence number comprises generating the unique ciphering sequence number for each of the plurality of MAC TBs based on a first transmission frame number for the MAC TB.

Clause 10: The method of any combination of Clauses 1-9, wherein the ciphering sequence number comprises a COUNT-C value.

Clause 11: The method of any combination of Clauses 1-10, wherein the encrypting each of the plurality of MAC TBs comprises encrypting each of the plurality of MAC TBs using one or more encryption keys.

Clause 12: The method of Clause 11, wherein the one or more encryption keys are unique within a cell group.

Clause 13: The method of Clause 12, wherein the one or more encryption keys comprise a ciphering key, an integrity key, or both the ciphering key and the integrity key.

Clause 14: The method of any combination of Clauses 11-13, wherein the one or more encryption keys are cell-specific Clause 15: The method of any combination of Clauses 11-14, wherein a plurality of encryption keys are configured, and wherein the method further comprises receiving signaling, during a cell change, indicating the one or more encryption keys, from the plurality of encryption keys, to be used in the cell.

Clause 16: The method of any combination of Clauses 1-15, wherein the plurality of MAC TBs comprises one or more MAC protocol data unit (PDUs) including any combination of any number of radio link control (RLC) control PDUs, packet data convergence protocol (PDCP) control PDUs, buffer status report (BSR) MAC control elements (MAC CEs), timing advance (TA) command MAC CEs, transmission configuration indicator (TCI) state activation MAC CEs, TCI state deactivation MAC CEs, secondary cell (SCell) activation MAC CEs, and SCell deactivation MAC CEs.

Clause 17: The method of Clause 16, wherein each MAC PDU further comprises a MAC security CE including a MAC sequence number (SN).

Clause 18: The method of Clause 17, wherein the MAC security CE further includes an indication of a MAC security protection type Clause 19: The method of any combination of Clauses 1-18, wherein the MAC security is configured by a base station, a core network entity, or a user plane security for application function (UPSAF).

Clause 20: The method of any combination of Clauses 1-19, further comprising: outputting or obtaining a radio resource control (RRC) reconfiguration message indicating a network entity supports MAC TB encryption, indicating activation of MAC TB encryption, or a combination thereof, wherein the encrypting the one or more MAC TBs is in response to the indication.

Clause 21. The method of any combination of Clauses 1-20, further comprising: outputting the one or more encrypted MAC TBs.

Clause 22: A method for wireless communications by a receiving device, comprising: obtaining a plurality of encrypted medium access control (MAC) transport blocks (TBs); and decrypting each of the plurality of MAC TBs based, in part, on a unique ciphering sequence number for each of the plurality of MAC TBs.

Clause 23. The method of Clause 22, receiving a unique MAC sequence number (SN) for each of the plurality of MAC TBs in a plurality of MAC protocol data units (PDUs), wherein the generating the unique ciphering sequence number comprises generating the unique ciphering sequence number for each of the plurality of MAC TBs based on the MAC SN for the MAC TB.

Clause 24: The method of Clause 23, wherein the MAC SN is unique to a cell group.

Clause 25: The method of Clause 24, wherein a range of valid MAC-SN values are specified for the cell group.

Clause 26: The method of any combination of Clauses 23-25, wherein the generating the unique ciphering sequence number comprises generating the unique ciphering sequence number for each of the plurality of MAC TBs further based on a component carrier (CC) identifier (ID) for the MAC TB.

Clause 27: The method of Clause 26, wherein the CC ID uniquely identifies the MAC TB across CCs within a cell group.

Clause 28: The method of any combination of Clauses 23-27, wherein the generating the unique ciphering sequence number comprises generating the unique ciphering sequence number for each of the plurality of MAC TBs further based on a TB identifier (ID) for the MAC TB.

Clause 29: The method of Clause 28, wherein the TB ID uniquely identifies the MAC TB within a multiple-input multiple-output (MIMO) transmission on a component carrier (CC) within a cell group.

Clause 30: The method of any combination of Clauses 22-29, wherein the generating the unique ciphering sequence number comprises generating the unique ciphering sequence number for each of the plurality of MAC TBs based on a first transmission frame number for the MAC TB.

Clause 31: The method of any combination of Clauses 22-30, wherein the ciphering sequence number comprises a COUNT-C value.

Clause 32: The method of any combination of Clauses 22-31, wherein the decrypting each of the plurality of MAC TBs comprises decrypting each of the plurality of MAC TBs using one or more encryption keys.

Clause 33: The method of Clause 32, wherein the one or more encryption keys are unique within a cell group.

Clause 34: The method of Clause 33, wherein the one or more encryption keys comprise a ciphering key, an integrity key, or both the ciphering key and the integrity key.

Clause 35: The method of any combination of Clauses 32-34, wherein the one or more encryption keys are cell-specific.

Clause 36: The method of any combination of Clauses 32-35, wherein a plurality of encryption keys are configured, and wherein the method further comprises receiving signaling, during a cell change, indicating the one or more encryption keys, from the plurality of encryption keys, to be used in the cell.

Clause 37: The method of any combination of Clauses 22-36, wherein the plurality of MAC TBs comprises one or more MAC protocol data unit (PDUs) including any combination of any number of radio link control (RLC) control PDUs, packet data convergence protocol (PDCP) control PDUs, buffer status report (BSR) MAC control elements (MAC CEs), timing advance (TA) command MAC CEs, transmission configuration indicator (TCI) state activation MAC CEs, TCI state deactivation MAC CEs, secondary cell (SCell) activation MAC CEs, and SCell deactivation MAC CEs.

Clause 38: The method of Clause 37, wherein each MAC PDU further comprises a MAC security CE including a MAC sequence number (SN).

Clause 39: The method of Clause 38, wherein the MAC security CE further includes an indication of a MAC security protection type.

Clause 40: The method of any combination of Clauses 22-39, wherein the MAC security is configured by a base station, a core network entity, or a user plane security for application function (UPSAF).

Clause 41: The method of any combination of Clauses 22-40, further comprising outputting or obtaining a radio resource control (RRC) reconfiguration message indicating a network entity supports MAC TB encryption, indicating activation of MAC TB encryption, or a combination thereof.

Clause 42: An apparatus, comprising: a memory comprising executable instructions; and a processor configured to execute the executable instructions and cause the apparatus to perform a method in accordance with any one of Clauses 1-41.

Clause 43: An apparatus, comprising means for performing a method in accordance with any one of Clauses 1-41.

Clause 44: A non-transitory computer-readable medium comprising executable instructions that, when executed by a processor of an apparatus, cause the apparatus to perform a method in accordance with any one of Clauses 1-41.

Clause 45: A computer program product embodied on a computer-readable storage medium comprising code for performing a method in accordance with any one of Clauses 1-41.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, “a processor,” “at least one processor” or “one or more processors” generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, “a memory,” “at least one memory” or “one or more memories” generally refers to a single memory configured to store data and/or instructions, multiple memories configured to collectively store data and/or instructions.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c. b-b. b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining and the like. Also, “determining” may include receiving (e.g., receiving information), accessing (e.g., accessing data in a memory) and the like. Also, “determining” may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean “one and only one” unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communications, the apparatus comprising:
- one or more memories; and
- one or more processors, coupled to the one or more memories, configured to cause the apparatus to:
  - derive, at a distributed unit (DU), a medium access control (MAC) security key from a higher-level security service key;
  - generate a ciphering sequence number that uniquely identifies each MAC transport block (TB) of a plurality of MAC TBs within a cell group, the ciphering sequence number being based on a MAC sequence number that is initialized upon derivation of the MAC security key;
  - insert, into a MAC protocol data unit (PDU) of at least one of the MAC TBs, a MAC security control element including the MAC sequence number and an indication of a MAC security protection type, wherein the MAC security protection type indicates protection of MAC control elements; and
  - encrypt each MAC TB of the plurality of MAC TBs based, in part, on the ciphering sequence number for each MAC TB and the MAC security key.

2. The apparatus of claim 1, wherein a range of valid MAC sequence number values are specified for the cell group.

3. The apparatus of claim 1, wherein the one or more processors being configured to cause the apparatus to generate the ciphering sequence number comprises the one or more processors being configured to cause the apparatus to generate the ciphering sequence number for each MAC TB of the plurality of MAC TBs further based on a component carrier (CC) identifier (ID) for the MAC TB.

4. The apparatus of claim 3, wherein the CC ID uniquely identifies the MAC TB across CCs within the cell group.

5. The apparatus of claim 1, wherein the one or more processors being configured to cause the apparatus to generate the ciphering sequence number comprises the one or more processors being configured to cause the apparatus to generate the ciphering sequence number for each MAC TB of the plurality of MAC TBs further based on a TB identifier (ID) for the MAC TB.

6. The apparatus of claim 5, wherein the TB ID uniquely identifies the MAC TB within a multiple-input multiple-output (MIMO) transmission on a component carrier (CC) within the cell group.

7. The apparatus of claim 1, wherein the one or more processors being configured to cause the apparatus to generate the ciphering sequence number comprises the one or more processors being configured to cause the apparatus to generate the ciphering sequence number for each MAC TB of the plurality of MAC TBs further based on a first transmission frame number for the MAC TB.

8. The apparatus of claim 1, wherein the ciphering sequence number comprises a COUNT-C value.

9. The apparatus of claim 1, wherein the MAC security key comprises one or more encryption keys.

10. The apparatus of claim 9, wherein the one or more encryption keys are unique within the cell group.

11. The apparatus of claim 10, wherein the one or more encryption keys comprise a ciphering key, an integrity key, or both the ciphering key and the integrity key.

12. The apparatus of claim 9, wherein the one or more encryption keys are cell- specific.

13. The apparatus of claim 9, wherein a plurality of encryption keys are configured, and wherein the one or more processors are configured to cause the apparatus to receive signaling, during a cell change, indicating the one or more encryption keys, from the plurality of encryption keys, to be used in the cell.

14. The apparatus of claim 1, wherein the plurality of MAC TBs comprises one or more MAC PDUs including any combination of any number of radio link control (RLC) control PDUs, packet data convergence protocol (PDCP) control PDUs, buffer status report (BSR) MAC control elements (MAC CEs), timing advance (TA) command MAC CEs, transmission configuration indicator (TCI) state activation MAC CEs, TCI state deactivation MAC CEs, secondary cell (SCell) activation MAC CEs, and SCell deactivation MAC CEs.

15. The apparatus of claim 1, wherein the MAC security is configured by a base station, a core network entity, or a user plane security for application function (UPSAF).

16. The apparatus of claim 1, wherein:
- the one or more processors are configured to cause the apparatus to transmit or receive a radio resource control (RRC) reconfiguration message indicating a network entity supports MAC TB encryption, indicating activation of MAC TB encryption, or indicating a combination thereof; and
- the one or more processors being configured to cause the apparatus to encrypt each MAC TB of the plurality of MAC TBs comprises the one or more processors being configured to cause the apparatus to encrypt the plurality of MAC TBs in response to the indication.

17. The apparatus of claim 1, wherein the one or more processors are configured to cause the apparatus to output the one or more encrypted MAC TBs.

18. An apparatus configured for wireless communications, the apparatus comprising:
- one or more memories; and
- one or more processors configured to cause the apparatus to:
  - obtain a plurality of encrypted medium access control (MAC) transport blocks (TBs), each MAC TB included in a MAC protocol data unit (PDU);
  - obtain, from a MAC security control element included in the MAC PDU, a MAC sequence number and an indication of a MAC security protection type, wherein the MAC security protection type indicates protection of MAC control elements;
  - generate a ciphering sequence number that uniquely identifies each MAC TB within a cell group, the ciphering sequence number being based on at least the MAC sequence number; and
  - decrypt each MAC TB of the plurality of MAC TBs based, in part, on the ciphering sequence number for each MAC TB and a MAC security key.

19. The apparatus of claim 18, wherein a range of valid MAC sequence number values are specified for the cell group.

20. The apparatus of claim 18, wherein the one or more processors being configured to cause the apparatus to generate the ciphering sequence number comprises the one or more processors being configured to cause the apparatus to generate the ciphering sequence number for each MAC TB of the plurality of MAC TBs further based on a component carrier (CC) identifier (ID) for the MAC TB.

21. The apparatus of claim 20, wherein the CC ID uniquely identifies the MAC TB across CCs within the cell group.

22. The apparatus of claim 18, wherein the one or more processors being configured to cause the apparatus to generate the ciphering sequence number comprises the one or more processors being configured to cause the apparatus to generate the ciphering sequence number for each MAC TB of the plurality of MAC TBs further based on a TB identifier (ID) for the MAC TB.

23. A method for wireless communications, the method comprising:

deriving, at a distributed unit (DU), a medium access control (MAC) security key from a higher-level security service key;

generating a ciphering sequence number that uniquely identifies each MAC transport block (TB) of a plurality of MAC TBs within a cell group, the ciphering sequence number being based on a MAC sequence number that is initialized upon derivation of the MAC security key;

inserting, into a MAC protocol data unit (PDU) of at least one of the MAC TBs, a MAC security control element including the MAC sequence number and an indication of a MAC security protection type, wherein the MAC security protection type indicates protection of MAC control elements; and encrypting each MAC TB of the plurality of MAC TBs based, in part, on the ciphering sequence number for each MAC TB and the MAC security key.

24. A method for wireless communications, the method comprising:

obtaining a plurality of encrypted medium access control (MAC) transport blocks (TBs), each MAC TB included in a MAC protocol data unit (PDU);

obtaining, from a MAC security control element included in the MAC PDU, a MAC sequence number and an indication of a MAC security protection type, wherein the MAC security protection type indicates protection of MAC control elements;

generating a ciphering sequence number that uniquely identifies each MAC TB within a cell group, the ciphering sequence number being based on at least the MAC sequence number; and decrypting each MAC TB of the plurality of MAC TBs based, in part, on the ciphering sequence number for each MAC TB and a MAC security key.

* * * * *